(12) United States Patent
P et al.

(10) Patent No.: US 8,510,197 B2
(45) Date of Patent: Aug. 13, 2013

(54) FINANCIAL INSTRUMENT POSITION AND SUBPOSITION MANAGEMENT

(75) Inventors: Madhusudan P, Bangalore (IN); Pankaj Jain, Delhi (IN); Ar Vinodh, Chennai (IN); Klaus Mueller, Neustadt a.d. Weinstrasse (DE)

(73) Assignee: SAP AG, Walldorf (DE)

( * ) Notice: Subject to any disclaimer, the term of this patent is extended or adjusted under 35 U.S.C. 154(b) by 454 days.

(21) Appl. No.: 12/609,739

(22) Filed: Oct. 30, 2009

(65) Prior Publication Data
US 2011/0106726 A1    May 5, 2011

(51) Int. Cl.
*G06Q 40/00*    (2012.01)
(52) U.S. Cl.
USPC .............................. 705/36 R; 705/35; 705/37
(58) Field of Classification Search
USPC ............................................ 705/35, 36 R, 37
See application file for complete search history.

(56) References Cited

U.S. PATENT DOCUMENTS

| | | | | |
|---|---|---|---|---|
| 4,486,853 | A * | 12/1984 | Parsons | 345/418 |
| 5,956,725 | A * | 9/1999 | Burroughs et al. | 1/1 |
| 6,173,276 | B1 * | 1/2001 | Kant et al. | 706/50 |
| 7,353,237 | B2 * | 4/2008 | Birkenhauer et al. | 1/1 |
| 7,653,581 | B2 * | 1/2010 | Poetzsch | 705/36 R |
| 7,756,896 | B1 * | 7/2010 | Feingold | 707/791 |
| 7,788,167 | B1 * | 8/2010 | Deitz et al. | 705/37 |
| 7,813,979 | B2 * | 10/2010 | Poetzsch | 705/35 |
| 8,060,421 | B1 * | 11/2011 | Wang | 705/35 |
| 2002/0120542 | A1 * | 8/2002 | Higgins | 705/36 |
| 2003/0023607 | A1 * | 1/2003 | Phelan et al. | 707/100 |
| 2003/0101125 | A1 * | 5/2003 | McGill et al. | 705/37 |
| 2003/0126056 | A1 * | 7/2003 | Hausman et al. | 705/36 |
| 2003/0130919 | A1 | 7/2003 | Templeton et al. | |
| 2004/0133445 | A1 * | 7/2004 | Rajan et al. | 705/1 |
| 2005/0222934 | A1 * | 10/2005 | Poetzsch | 705/36 |
| 2005/0222939 | A1 * | 10/2005 | Poetzsch | 705/37 |
| 2005/0234980 | A1 * | 10/2005 | Birkenhauer et al. | 707/103 Y |
| 2006/0129415 | A1 * | 6/2006 | Thukral et al. | 705/1 |
| 2008/0033775 | A1 | 2/2008 | Dawson et al. | |
| 2008/0071657 | A1 * | 3/2008 | Matic | 705/35 |
| 2008/0189322 | A1 * | 8/2008 | Stark et al. | 707/102 |
| 2009/0313175 | A1 * | 12/2009 | Mueller et al. | 705/36 R |
| 2010/0145875 | A1 * | 6/2010 | Schmid et al. | 705/36 R |
| 2011/0087572 | A1 * | 4/2011 | Jain et al. | 705/35 |

OTHER PUBLICATIONS

SAP, FIN Financials SAP ERP Central Component Release 6.0, 2006, SAP, pp. 1-97.*

* cited by examiner

*Primary Examiner* — Kenneth Bartley
(74) *Attorney, Agent, or Firm* — Kenyon & Kenyon LLP

(57) ABSTRACT

An analyzer module may read a selector key and a financial object number stored within a financial object. The financial object number may be sent to a selector module associated with the selector key. The selector module may read a selector strategy key stored within the financial object. A processor programmed by the selector module may retrieve a set of position values associated with the financial object based, at least in part, on the selector strategy key. A mapping module may be chosen by the selector module based upon a financial instrument type. The mapping module may store the position values within the financial object. A price calculator may generate a key figure for each of the position values. A list of the position values may be displayed to a user on a display device.

18 Claims, 7 Drawing Sheets

500

[Figure: Single Value Analysis screen]

FIG. 5
500

| Single Value Analysis | | | | | |
|---|---|---|---|---|---|
| Variant | | | | | |
| Crcy | EUR | Euro | | | |
| Eval. Type | 0001 | MRA Standard Evaluation | | | |
| Evaluation Date | 01.01.2009 | | | | |
| Horizon of Evaluation | 01.01.2009 | | | | |
| Scenario | | Current Market Data | | | |
| Mkt Data Shift | | Without Market Data Shift | | | |
| Selection Characteristics | | | | | |
| Characteristic | Selection | Name | | | |
| Transaction | 0000000002982 | | | | |

| Exce | FO Cat. | Financial Object | Short Name | Σ | Net Present Value | Σ Clean Price in NPV Calculation |
|---|---|---|---|---|---|---|
| OO▣ | Derivatives | 0001/2982 | Security Forwards | | 2,317.02 | 2,317.02 |
| | | | | ▪ | 2,317.02 ▪ | 2,317.02 |

600

FINANCIAL INSTRUMENT POSITION AND SUBPOSITION MANAGEMENT

BACKGROUND

Financial instrument management applications may be used to monitor various types of financial instruments. One category of financial instruments may include complex financial instruments. Complex financial instruments may include derivatives, options, futures options, warrants and swaps. The position of a single complex financial instrument may include many subparts with some subparts being used as hedging instruments. A hedging instrument is a position established to offset exposure to price fluctuations in some opposite position. The primary goal in utilizing hedging instruments is to minimize exposure to risk. For example, a first subpart of a complex financial instrument may be used to hedge against a subpart of an asset position or another complex financial instrument. In a hedging relationship, the first subpart of a complex financial instrument may be chosen so that its price fluctuates in a manner opposite to that of the second subpart of an asset position or another complex financial instrument.

In many countries, regulatory bodies may require strict monitoring and reporting associated with hedging relationships. Often, these requirements also apply to the individual subparts used as hedging instruments within a complex financial instrument. Further, the user of a financial instrument management application may desire to perform an evaluation of a complex financial instrument that requires an analysis of the included hedging relationships. However, current solutions are only capable of performing evaluations of complex financial instruments as a whole and do not allow a user to perform an evaluation of the subparts of a complex financial instrument, including an evaluation at the position/sub position level.

Furthermore, it may be desirable to analyze a financial instrument many times throughout a single trading period. A trading period may be the period of time during a single day that a particular market is open for trading. For example, the position held for a single financial instrument may change many times within a single day. The position of a financial instrument may fluctuate throughout the day as one or more transactions involving the financial instrument take place. It may also be desirable to analyze a financial instrument for hedging effectiveness or other factors on a transaction basis. A user may desire to calculate the effectiveness of a hedging relationship based upon a past transaction. Current systems only allow for the analysis of a financial object at the end of a day or other fixed trading period. Further, current systems do not provide a simple solution for the evaluation of a financial instrument on a transaction basis. Therefore, a need exists for systems and methods of performing individual evaluations of a complex financial instrument at a position and subposition level at any time during a trading period and on a transaction basis.

BRIEF DESCRIPTION OF THE DRAWINGS

FIG. 5 illustrates a graphical user interface according to an embodiment of the present invention.

DETAILED DESCRIPTION

Embodiments describe systems and methods for the management of positions and subpositions within a financial instrument management application. One or more embodiments describe position and subposition management used in the context of complex financial instruments and financial instrument management software. In an embodiment, an analyzer module may read a selector key and a financial object number stored within a financial object. The financial object number may be sent to a selector module associated with the selector key. The selector module may read a selector strategy key stored within the financial object. A processor programmed by the selector module may retrieve a set of position values associated with the financial object based, at least in part, on the selector strategy key. A mapping module may be chosen by the selector module based upon a financial instrument type. The mapping module may store the position values within the financial object. A price calculator may generate a key figure for each of the position values. A list of the position values may be displayed to a user on a display device.

Management of positions and subpositions may provide additional functionality not conventionally available. For example, individual positions or sub positions of a financial instrument may be displayed to a user throughout a trading period. For each individual position or subpositions, calculations may be performed and key figures, such as net present value, may be displayed. For example, a financial instrument position may contain one or more subpositions that are used as a hedge against other positions. Management using positions and subpositions may provide a user with a detailed list of all positions and subpositions along with calculations associated thereto.

Figure 1:
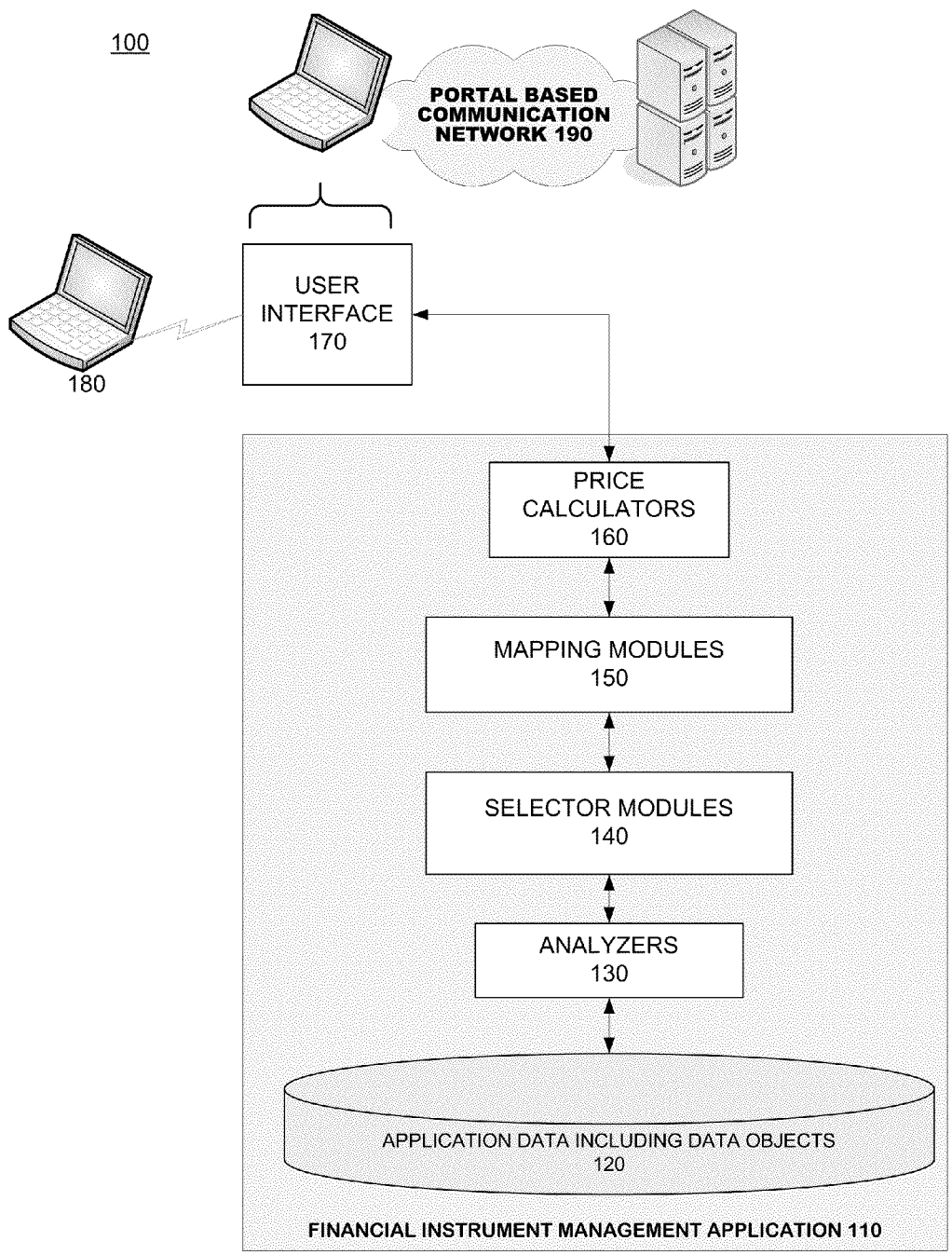
FIG. 1 is a system according to an embodiment of the present invention.

FIG. 1 illustrates a system 100 according to an embodiment of the present invention. System 100 may include a financial instrument management application 110. Financial instrument management application 110 may be used for the storage and display of data related to financial instruments. For example, financial instrument management application may use data stored about one or more financial instruments to calculate data, such as the net present value of a financial instrument or risk information associated with a financial instrument, for example. Information relating to a financial instrument may be displayed to a user using a graphical user interface. In addition, calculations regarding the financial instrument may be done automatically in response to instructions received by a user. For example, upon receiving user feedback from a mouse, touch screen or other input method, the financial instrument management application may automatically perform all necessary operations and present data related to the financial instrument.

System 100 may also include application data 120. Application data 120 may be stored on a computer-readable storage medium. Financial instrument management application 110 may access application data 120 by sending instructions to a processor that instruct the processor to retrieve application data 120 from the computer-readable storage medium. Application data 120 may include one or more data objects. Each data object may represent a single financial instrument. Each data object representing a financial instrument may include one or more subparts. Each subpart may represent a position or subposition associated with the financial instrument.

In an embodiment, system 100 may include analyzers 130. Analyzers 130 may be used to analyze a selector key and financial object number stored within a data object representing a financial instrument. The selector key may identify the type of financial instrument and may be used to associate a particular financial instrument with a proper type of selector module. The financial object number may include a unique number used to identify a financial instrument. The financial object number may be sent to a selector module based, at least in part, on the selector key.

In an embodiment, system 100 may include selector modules 140. Selector modules 140 may include a plurality of selector modules, each used for a different type of financial instrument. For example, there may be separate selector modules for stock positions, bond positions, OTC options, forward stock transactions and exchange traded derivatives such as futures and listed options. A particular selector module may receive a financial object number that identifies a financial instrument. The selector module may read a selector strategy key stored within a financial object. The selector strategy key may identify a key date, which may be a particular date used to identify position or subposition information. The selector strategy key may identify a business transaction identifier, which may identify a particular business transaction associated with desired position or subposition information. A selector strategy key may be used to identify particular actions to performed by a selector module.

A selector module may use a received financial object number and selector strategy key to retrieve a set of position values associated with a financial instrument. The set of position values may include information regarding positions of the financial instrument or subpositions associated with subparts of the financial instrument. For example, the set of position values may include information associated with hedging relationships contained within a financial instrument. Further, the position values may include a standardized representation of a position. A standardized representation may include a risk representation. A selector module may retrieve a set of position values based upon, at least in part, a selector strategy key. For example, if a selector strategy key indicates a key date, the set of retrieved position values may correspond to the key date. Further, a selector module may be used to retrieve an internally standardized representation of a position or subposition. In this manner, a fair market kernel may be used to calculate key figures by "combining" a risk representation with market data using one or more mathematical models.

System 100 may include an infrastructure capable of uploading position information from a selector module into a results database. For example, a results database may be stored on the same computer-readable storage medium as financial instrument management application 110. Alternatively, a results database may be stored remotely and may be accessed using portal based communication network 190. A results database may store records for each financial instrument and associate position information with each financial instrument. The information stored within a results database may be used to calculate key figures for position and subposition of a financial instrument.

In an embodiment, a selector module may use a financial object number to obtain the type of the financial instrument. Since there may exist a particular selector module for each type of financial instrument, each selector module may have a default financial instrument type associated with it. Using a financial instrument type, a selector module may select a mapping module from mapping modules 150. Mapping modules 150 may contain a plurality of mapping modules specifically designed for different types of financial instruments. Each mapping module may be used to store a set of position values within a financial object. A financial object may contain a plurality of fields that may include information regarding position values. A mapping module may create fields within a financial object or populate existing fields. In either case, a mapping module may store position values within a financial object.

Position values may be used to calculate key figures for each individual position or subposition of a financial instrument. Key figures may include net present value, value at risk, sensitivity or convexity. These key figures may be used in conjunction with reporting requirements of a regulatory body. For example, key figures may include risk analysis based upon the results of an effectiveness test for hedging relationships. In addition, a user of financial instrument management application 110 may desire to calculate one or more key figures for business strategy, investment strategy or record keeping purposes. Key figures may be calculated for each individual position or subposition at any period of time. For example, a user may request key figures for a financial instrument at each logical second within a day. Further, a user may request key figures for a financial instrument based upon any transaction associated with the financial instrument. Key figures may be calculated using information before the chosen transaction, or may include the chosen transaction within the calculation. In this manner, the user may see the key figures for a financial instrument at any time during the past or present using key dates or transactions. The key figures may be calculated on the fly and returned to the user almost instantly.

In an embodiment, system 100 may include price calculators 160. Price calculators 160 may access position values stored within a results database. Using accessed position values, price calculators 160 may calculate one or more key figures for position or subpositions of a financial instrument. Price calculators may be stored as individual modules capable of particular calculations. Alternatively, a single price calculator module may be capable of performing all necessary calculations.

Position values may be displayed to a user on user interface 170. User interface 170 may be displayed to a user on a display device. The display device may be integrated into computing device 180. Alternatively, the display device may be connected to a separate computing device. User interface 170 may be a graphical user interface that includes one or more graphical user interface elements. A graphical user interface element may be a checkbox, radio button, hyperlink, software button or other graphic element that may be selected by a user. Position values and associated calculated key figures may be displayed within user interface 170 in response to user interaction with a graphical user interface element. Utilizing a graphical user interface element, a user may toggle between an overview of a financial instrument and a detailed view of the financial instrument that includes an individual listing of calculations for each position and subposition.

Figure 2:
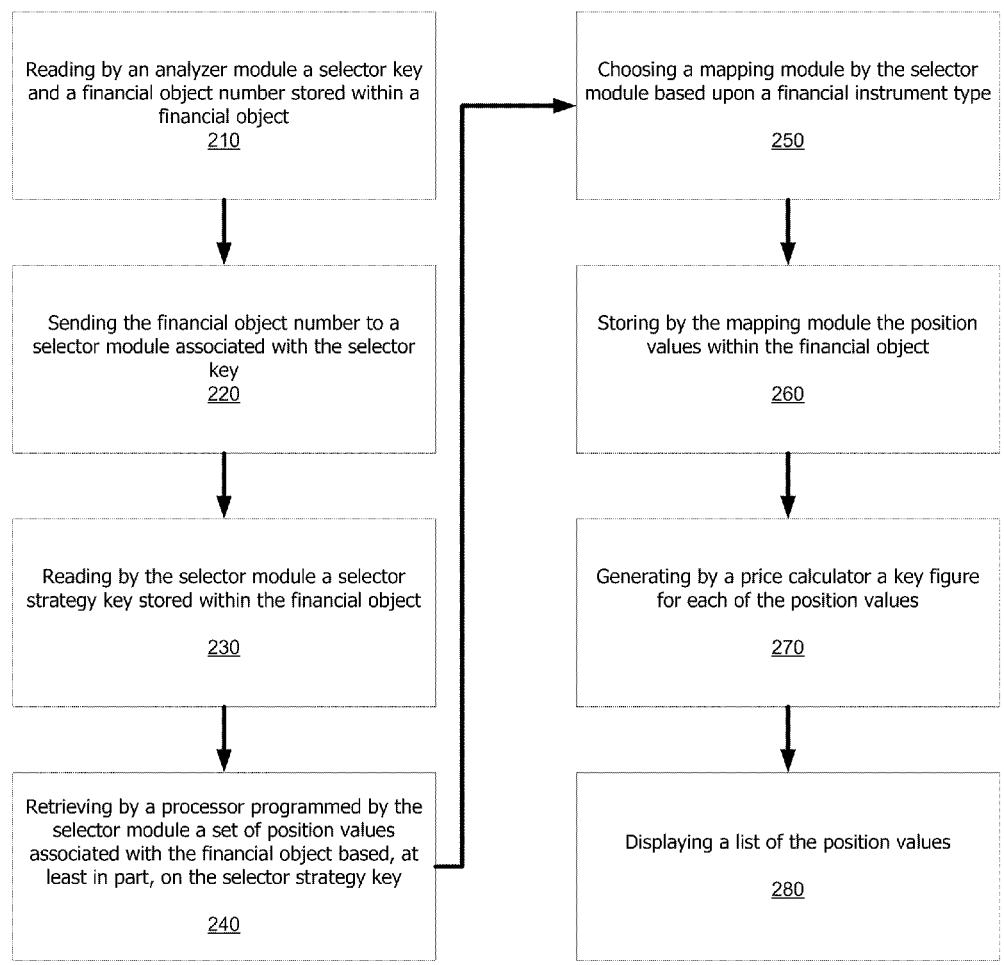
FIG. 2 is a logic flow according to an embodiment of the present invention.

FIG. 2 illustrates logic flow 200 according to an embodiment of the present invention. Logic flow 200 includes step 210. At step 210, a financial object representing a financial instrument is read by an analyzer module. This step may be performed by a software application, such as financial instrument management application 110. Data representing financial object may be stored on a computer-readable storage medium. The analyzer module may read one or more data fields from the financial object. In an embodiment, the analyzer module may read a selector key and a financial object number stored within a financial object. Further, a selector strategy key may identify a type of financial instrument. An analyzer module may choose a selector module based upon a type of financial instrument associated with the financial object.

At step 220, a financial object number is sent to a selector module. The selector module may be chosen based upon a selector key that is read in step 210. A financial instrument management application may contain a plurality of selector modules. Each selector module may be customized for a particular type of financial instrument. A selector key may identify the proper selector module for each financial object. In an embodiment, a selector module may receive a financial object number from an analyzer module. Using a financial object number, a selector module may read a selector strategy key stored within a financial object at step 230. A selector strategy key may identify a key date or business transaction identifier, for example. The selector strategy key may be a value entered by the user of a financial instrument management application. For example, the selector strategy key may be generated in response to user interaction with a graphical user interface element. Further, a user may store a particular preference for a selector strategy key within a settings portion of a financial instrument management application.

At step 240, a processor is instructed, or programmed, by a selector module to retrieve a set of position values associated with a financial object. The processor may be instructed based, at least in part, on a selector strategy key. The position values may be stored within a results database. At step 250, a selector module may use a financial object number to obtain the type of the financial instrument. Since there may exist a particular selector module for each type of financial instrument, each selector module may have a default financial instrument type associated with it. Using a financial instrument type, a selector module may select a mapping module.

At step 260, a selected mapping module may store position values within a financial object. A financial object may contain a plurality of fields that may include information regarding position values. A mapping module may create fields within a financial object or populate existing fields. In either case, a mapping module may store position values within a financial object.

At step 270, position values may be used to calculate key figures for each individual position or subposition of a financial instrument. Key figures may include net present value, value at risk, sensitivity or convexity. Price calculators may access position values stored within a results database. Using accessed position values, price calculators may calculate one or more key figures for position or subpositions of a financial instrument. Price calculators may be stored as individual modules capable of particular calculations. Alternatively, a single price calculator module may be capable of performing all necessary calculations.

At step 280, a list of position values may be displayed. The position values may be displayed within a user interface in response to user interaction with a graphical user interface element. Utilizing a graphical user interface element, a user may toggle between an overview of a financial instrument and a detailed view of the financial instrument that includes an individual listing of calculations for each position and subposition.

Figure 3:
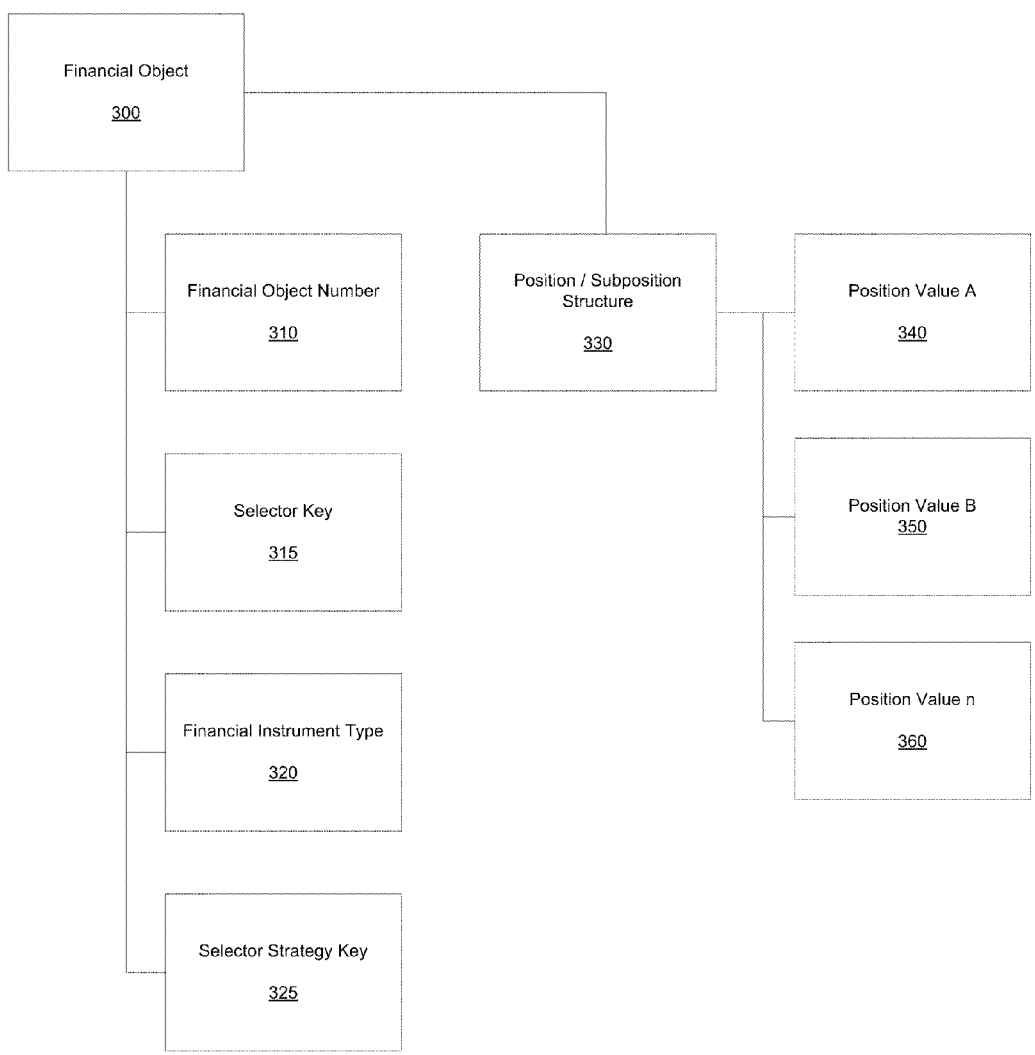
FIG. 3 illustrates a financial object according to an embodiment of the present invention.

FIG. 3 illustrates financial object 300 according to an embodiment of the present invention. Financial object 300 may be a data object stored on a computer-readable storage medium and accessed by a financial instrument management application that is executed by a processor. Financial object 300 may represent a financial instrument such as a stock, bond, forward stock transaction, OTC option, future or interest rate swap. The positions of a particular financial instrument may change many times during a single trading period, such as a single day. Therefore, it may be desirable to store position information within financial object 300.

In an embodiment, financial object 300 may include financial object number 310. Financial object number 310 may uniquely identify financial object 300 among a large number of other financial objects. Further, financial object number 310 may be used to associate financial object 300 with a particular financial instrument. Financial object 300 may include selector key 315. Selector key 315 may identify a particular type of selector module that is compatible with financial object 300. Selector key 315 may be accessed by an analyzer module to determine which selector module to use during position or subposition management.

Financial object 300 may include financial instrument type 320. Financial instrument type 320 is a field used to identify the type of financial instrument represented. This field may be accessed by a selector module and used by the selector module to select a mapping module. Financial object 300 may also include selector strategy key 325. Selector strategy key 325 may contain information regarding the specific strategy to be used by a selector module while collecting position values associated with a financial instrument. Selector strategy key 325 may contain the value of a key date or the identifier of a business transaction. This information may be entered by a user through interaction with a graphical user interface or may be stored within a settings database of a financial instrument management application.

In an embodiment of the present invention, financial object 300 may represent a financial instrument. The represented financial instrument may have multiple subparts. Some subparts may be hedging positions against other subparts. For each subpart, and the financial instrument as a whole, position value information is available. For example, during a single day of trading, a particular financial instrument may be bought and sold several times, changing the value of the entire position and each subposition. Financial object 300 may include position/subposition structure 330 to store information regarding position values. As shown, position/subposition structure 330 has three position values, A 340, B 350 and n 360, where n is any positive integer. A particular financial instrument may have any number of position values. Position values within position/subposition structure 330 may be populated by a mapping module. Each position value may include information about a particular transaction or price, such that a calculator module may calculate key figures for the associated financial instrument. In an embodiment of the present invention, a financial object may represent only a single position or subposition. In this manner, a heading relationship may exist between one or more financial objects.

Figure 4:
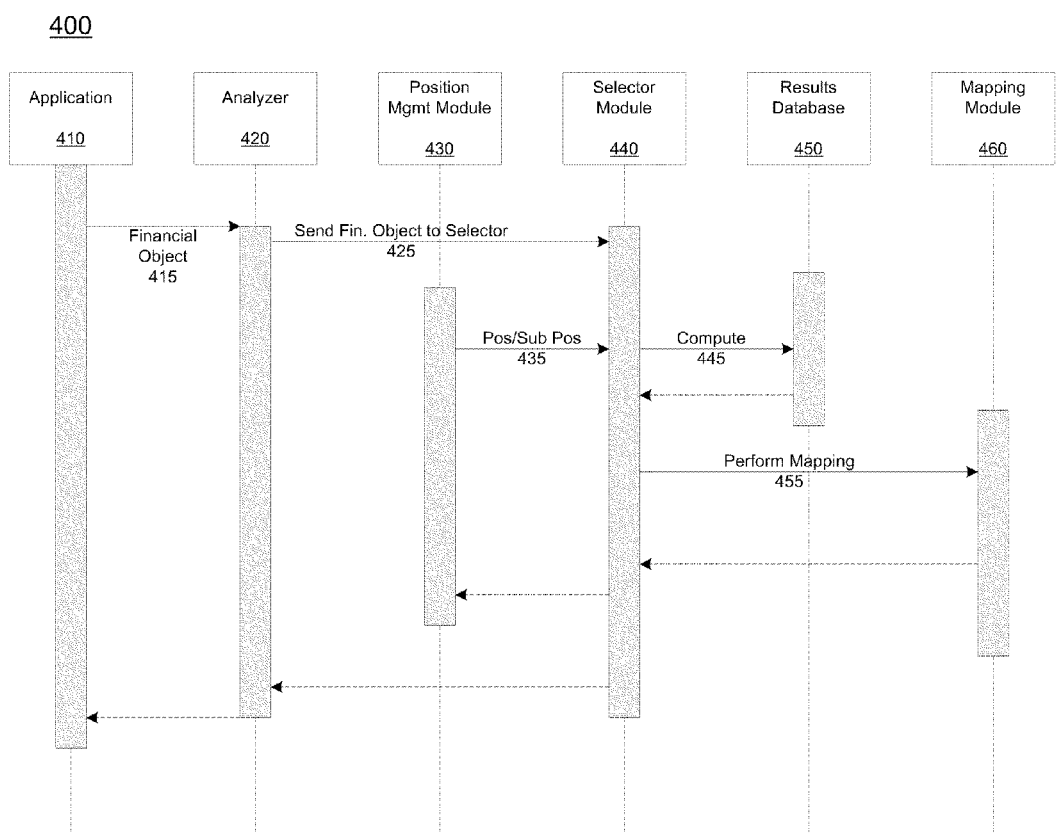
FIG. 4 is a logic flow according to an embodiment of the present invention.

FIG. 4 illustrates logic flow 400 according to an embodiment of the present invention. Application 410 may be an application used to manage financial instruments. For example, application 410 may be used to manage financial instruments where each financial instrument includes position and subposition information. At step 415, a financial object number is sent to analyzer 420. Analyzer 420 may read information stored within a financial object, such as a selector key and financial object number. At step 425, analyzer 420 may send a financial object or financial object number to selector module 440. Selector module 440 may be chosen by analyzer 420 based upon a selector key. Alternatively, selector module 440 may contain one or more selector modules that may be chosen to process the financial object.

At step 435, position/subposition management module 430 may send position and subposition information to selector module 440. Position/subposition management module 430 may send position and subposition information to selector module 440 based upon a selector strategy key. At step 445, selector module may send position value information to results database 450. Position value information stored within results database 450 may be used by various modules within an application, such as calculator modules, to compute key figures for a financial instrument. At step 455, selector module communication position value information to a mapping module 460. Mapping module 460 may be selected based upon the type of financial instrument represented. Mapping module 460 may populate position and subposition fields within a financial object with position values received from selector module 440.

FIG. 5 illustrates graphical user interface 500 according to an embodiment of the present invention. Graphical user interface 500 may be a portion of a larger graphical user interface used within a financial instrument management application. For example, graphical user interface 500 may be a portion of a management pane of a financial instrument management application.

As illustrated, graphical user interface 500 may include information about a financial instrument. In particular, a single financial object is shown. A user may choose particular data that may be displayed with respect to a financial object. For example, a category, number, name, net present value and clean price calculation is shown. Other figures and field may be displayed.

Figure 6:
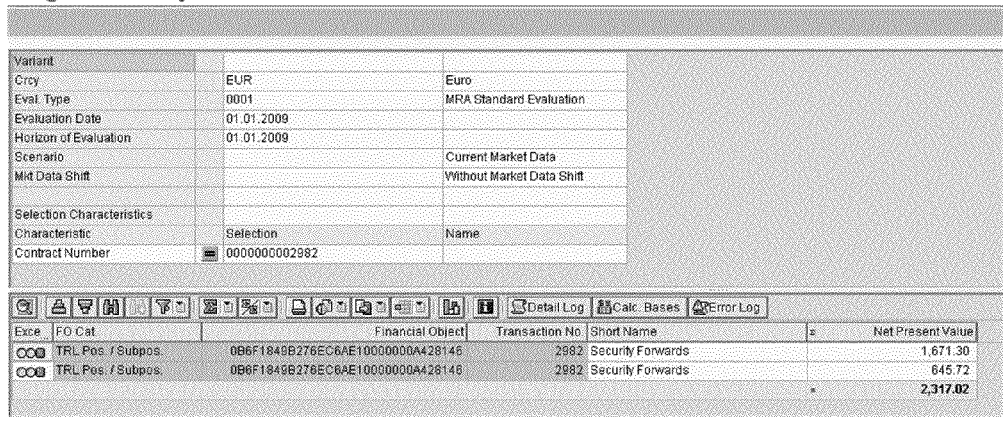
FIG. 6 illustrates a graphical user interface according to an embodiment of the present invention.

FIG. 6 illustrates graphical user interface 600 according to an embodiment of the present invention. Graphical user interface 600 may be a portion of a financial instrument management application. In an embodiment, graphical user interface 600 includes a summary of a single financial instrument. The data displayed with regard to individual positions or subpositions of a financial instrument may be displayed in response to user interaction with a graphical user interface element.

In an embodiment, graphical user interface 600 may display a plurality of rows and columns that contain information about the positions of a complex financial instrument. For example, each row may represent a separate transaction and position value associated with a financial instrument.

In an embodiment, graphical user interface 600 may include one or more columns that display calculated values for each subpart. As illustrated, column "Net Present Value" is shown. It can be appreciated that more or less columns may be shown and may display other calculated values. A user of a financial instrument management application may be provided with a control panel that allows them to choose which calculated values are displayed within graphical user interface 600.

Figure 7:
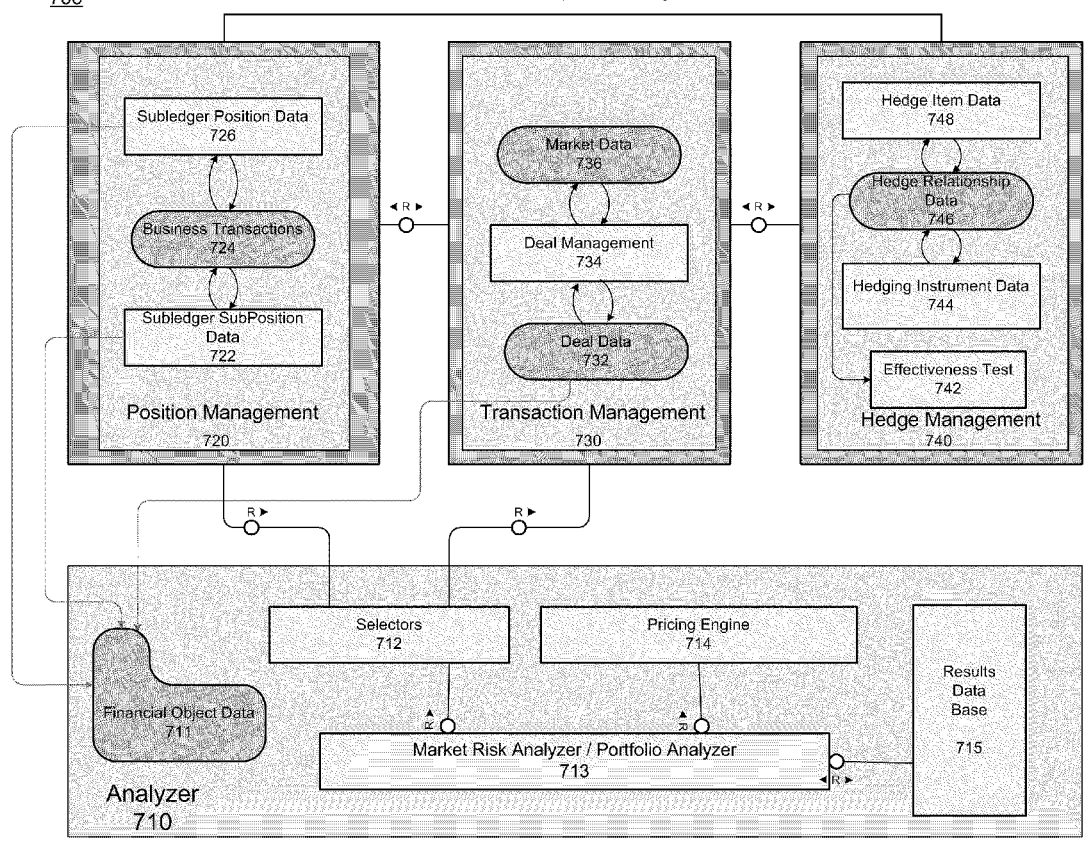
FIG. 7 illustrates a position/subposition management system according to an embodiment of the present invention.

FIG. 7 illustrates a position/subposition management system 700 according to an embodiment of the present invention. In an embodiment of the present invention, position/subposition management system 700 may include analyzer 710. Analyzer 710 may be used to perform analysis on one or more financial objects. For example, analyzer 710 may perform risk analysis on a financial object. Analyzer 710 may store information about a financial object at financial object 711. Analyzer 710 may receive a request to perform risk analysis on a financial object based upon a transaction associated with the financial object. A user may choose a particular transaction and the request to perform risk analysis on the financial object includes or excludes the chosen transaction based upon user interaction with a graphical user interface element. In an embodiment, analyzer 710 may include market risk analyzer/portfolio analyzer 713. Market risk analyzer/portfolio analyzer 713 may be used to perform risk and portfolio analysis operations on data associated with financial object 711. Results of risk and portfolio analysis performed on a financial object by market risk/portfolio analyzer 713 may be associated with the financial object and stored within results database 715, which may be stored on a computer-readable storage medium. In an embodiment, market risk analyzer/portfolio analyzer 713 may utilize pricing engine 714 to perform analysis on a financial object. Pricing engine 714 may include one or more price calculators that may be used to perform price calculation operations on data associated with a financial object.

In an embodiment of the present invention, analyzer 710 may include selectors 712. Selectors 712 may include one or more selector modules. Selectors modules may be computer executable instructions stored on a computer-readable storage medium. Each selector module may be used for a different type of financial instrument. For example, there may be separate selector modules for stock positions, bond positions, OTC options, forward stock transaction and exchange traded derivatives such as futures and listed options. A particular selector module may receive a financial object number that identifies a financial instrument. The selector module may read a selector strategy key stored within a financial object. The selector strategy key may identify a key date, which may be a particular date used to identify position or subposition information. The selector strategy key may identify a business transaction identifier, which may identify a particular business transaction associated with desired position or subposition information. A particular transaction associated with a financial object may be chosen based upon user interaction with a graphical user interface element. A selector strategy key may be used to identify particular actions to performed by a selector module.

A selector module may use a received financial object number and selector strategy key to retrieve a set of position values associated with a financial instrument. The set of position values may include information regarding positions of the financial instrument or subpositions associated with subparts of the financial instrument. For example, the set of position values may include information associated with hedging relationships contained within a financial instrument. A selector module may retrieve a set of position values based upon, at least in part, a selector strategy key. For example, if a selector strategy key indicates a key date, the set of retrieved position values may correspond to the key date. In an embodiment of the present invention, position/subposition management system 700 may include position management module 720. Position management module 720 may be used to store information regarding one or more positions or subpositions of a financial instrument.

An embodiment of the present invention may include a stock position selector module. A stock position selector module may be used to select position or subposition data associated with a financial object based upon either a key data or a specified business transaction. Using a key date, a stock position selector module may select a number of units within the position or subposition as of a given key date. Using a specified business transaction identifier, a stock position selector module may get the number of units within a position or subposition before the specified business transaction took place. Alternatively, based upon user interaction with a graphical user interface element, a stock position selector module may either include or exclude a specified business transaction when selection a number of units associated with the financial object. The choice of whether to include a specified business transaction may be set as a default setting by a user, decided by the system at runtime, or chosen by the user for each specified business transaction. Other selector module customized for different types of financial instruments may be available. For example, a forward stock transaction selector module may use forward stock transaction flow data to split a financial object into semantic parts. A bond selector module may take into count unit/nominal details. An OTC option selection module may utilize option information within a financial object. Likewise, a futures selector module may trace back and use an original deal to select position and subpositions related to a financial object.

In an embodiment of the present invention, position/subposition management system 700 may include position management module 720. Position management module 720 may include position and subposition information associated with a financial object. For example, position management module 720 may include subledger position data 726 and subledger subposition data 722. In addition, position management module 720 may include business transaction data 724. Business transaction data 724 may include business transaction data that is used by selectors 712. Business transaction data may include external deal data or internal business transaction data. For example, business transaction data may include a new book value according to a specific accounting principle or the designation of a hedging relationship. The designation of a hedging relationship may create a subposition of a position which is part of the hedge. A business transaction may be independent of a valuation area, meaning that it is independent of a specific account principle. For example, a sale or purchase. Alternatively, a business transaction may be valuation area specific. These business transactions may carry a market data container. The market data container may be different than the regular market data tables filled using popular investment data organizations. There may be many business transactions within a single day related to a single position. There may even be many designations of a hedging relationship within a single day.

An embodiment may include transaction management module 730. Transaction management module 730 may include data relating to market data, both internal and external and deal data. For example, transaction management module 730 may include market data 736 and deal data 732. Further, transaction management module 730 may include deal management 734, which is responsible for using deal data and market data to provide details on a particular financial instrument. For example, deal management data associated with a specified transaction may be provided to one or more modules to perform risk analysis and price calculations. Deal management data may include market data container storing market data relevant to a particular transaction. Deal management module 734 may choose deal data based upon a time associated with a specified business transaction. Further, deal management module 734 may handle all financial transactions that are externally visible to a counterparty. These may include all OTC transactions, sales of securities and purchases of securities.

In an embodiment of the present invention, position/subposition management system 700 may include hedge management module 740. Hedge management module 740 may be used to perform one or more hedge related functions. For example, hedge management module may receive information about a financial object, business transaction data and deal management data. Further, hedge management module 740 may include hedge relationship data 746 and hedge instrument data 744. Based upon this data, hedge management module may perform an effectiveness test using effectiveness test module 742. A processor may present on a display device risk information for a financial object based upon the results of the effectiveness test. Further, risk information associated with the financial instrument may be returned to analyzer 710 and stored within results database 715.

In an embodiment of the present invention, a risk representation of every position or subposition may be generated for each point in time measured by a business transaction identifier. The risk representation may be given at the logical second before a particular business transaction or the logical second after a business transaction. Using one or more financial math functions, a position or subposition may be used to generate a risk representation. The system may also control which market data is used, either ad-hoc market data or generated/simulated data.

If a series of business transactions are in the system, independent if whether they are valuation area dependent or independent, if they carry ad-hoc-market data or not, if a business transaction is entered in the system which is to be sorted before existing ones, the system takes care that the overall information (positions, subpositions, hedging relationships with their correct effectiveness test) may automatically be kept consistent and up-to-date. The system may automatically update the flows of the positions and subpositions which are touched and invalidates an effectiveness test if necessary.

In an embodiment, an effectiveness test may be used to calculate a hedging relationship. The hedge scenario may carry a financial mathematics method which may be used on a participant of the hedge depending on the role of the financial object in the hedging relationship (hedged item or hedging instrument). The selected hedging scenario which is used may be selected by the system, which in turn may select the formula which should be used in the calculation of an effectiveness test. If many business transactions happen on one day the system may provide the correct time-dependent risk representation and the correct use of the relevant market data and the correct mathematical calculations.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. A computer implemented method comprising the steps of:
   providing, by a computer processor, a plurality of selector modules each customized for different type of financial instrument;
   reading by the computer processor a selector key and a financial object number stored within a financial object, wherein the selector key identifies a financial instrument type of the financial object;
   determining, by the computer processor, a particular selector module from the plurality of selector modules based on the identified financial instrument type;
   sending by the computer processor the financial object number to the particular selector module to read
   a selector strategy key stored within the financial object;
   retrieving by the computer processor a set of position values associated with the financial object based, at least in part, on the selector strategy key, wherein the set of position values are retrieved from a results database and the position values include information regarding positions of the financial object or subpositions associated with subparts of the financial object;
   choosing a mapping module from a plurality of mapping modules by the computer processor based upon the financial instrument type identified by the selector key, wherein each of the mapping modules is configured to store a respective set of position values within a particular type of financial instrument;
   storing by the computer processor the retrieved set of position values within the financial object using the chosen mapping module;
   generating by the computer processor a key figure for each of the position values, wherein the key figure includes one or more of net present value, value at risk, sensitivity or convexity; and
   displaying a list of the position values and their respective associated key figures by the computer processor.

2. The method of claim 1, wherein the selector strategy key is a key date identifier.

3. The method of claim 1, wherein the selector strategy key is a business transaction identifier.

4. The method of claim 1, wherein the financial object represents a single position or subposition, the single position or subposition is involved within a hedging relationship.

5. The method of claim 1, wherein the financial instrument type is one selected from the group of stock, forward stock transaction, bond, over-the-counter (OTC) option, future and interest rate swap.

6. The method of claim 1, wherein the position values stored within the financial object include position or subposition information reflecting one or more transactions that have taken place during a trading period.

7. An article comprising a non-transitory computer-readable storage medium storing instructions that, when executed by a computer processor, perform the steps of:
   providing, by the computer processor, a plurality of selector modules each customize for a different type of financial instrument;
   reading by the computer processor a selector key and a financial object number stored within a financial object, wherein the selector key identifies a financial instrument type of the financial object;
   determining, by the computer processor, a particular selector module from the plurality of selector modules based on the identified financial instrument type;
   sending by the computer processor the financial object number to the particular selector module to read
   a selector strategy key stored within the financial object;
   retrieving by the computer processor a set of position values associated with the financial object based, at least in part, on the selector strategy key, wherein the set of position values are retrieved from a results database and the position values include information regarding positions of the financial object or subpositions associated with subparts of the financial object;
   choosing a mapping module from a plurality of mapping modules by the computer processor based upon the financial instrument type identified by the selector key, wherein each of the mapping modules is configured to store a respective set of position values within a particular type of financial instrument;
   storing by the computer processor the retrieved set of position values within the financial object using the chosen mapping module;
   generating by the computer processor a key figure for each of the position values, wherein the key figure includes one or more of net present value, value at risk, sensitivity or convexity; and
   displaying a list of the position values and their respective associated key figures by the computer processor.

8. The article of claim 7, wherein the selector strategy key is a key date identifier.

9. The article of claim 7, wherein the selector strategy key is a business transaction identifier.

10. The method of claim 7, wherein the financial object represents a single position or subposition, the single position or subposition is involved within a hedging relationship.

11. The article of claim 7, wherein the financial instrument type is one selected from the group of stock, forward stock transaction, bond, over-the-counter (OTC) option, future and interest rate swap.

12. The article of claim 7, wherein the position values stored within the financial object include position or subposition information reflecting one or more transactions that have taken place during a trading period.

13. A computer system for managing financial instruments comprising:
- a computer processor;
- a computer-readable storage medium; and
- a display device;
- wherein the computer processor performs the steps of:
  - providing, by the computer processor, a plurality of selector modules each customized for a different type of financial instrument;
  - reading by the computer processor a selector key and a financial object number stored within a financial object, wherein the financial object is stored on the computer-readable storage medium, wherein the selector key identifies a financial instrument type of the financial object;
  - determining, by the computer processor, a particular selector module from the plurality of selector modules based on the identified financial instrument type;
  - sending by the computer processor the financial object number to the particular selector module to read a selector strategy key stored within the financial object;
  - retrieving by the computer processor a set of position values associated with the financial object based, at least in part, on the selector strategy key, wherein the set of position values are retrieved from a results database and the position values include information regarding positions of the financial object or subpositions associated with subparts of the financial object;
  - choosing a mapping module from a plurality of mapping modules by the computer processor based upon the financial instrument type identified by the selector key, wherein each of the mapping modules is configured to store a respective set of position values within a particular type of financial instrument;
  - storing by the computer processor the retrieved set of position values within the financial object using the chosen mapping module;
  - generating by the computer processor a key figure for each of the position values, wherein the key figure includes one or more of net present value, value at risk, sensitivity or convexity; and
  - displaying a list of the position values and their respective associated key figures by the computer processor.

14. The computer system of claim 13, wherein the selector strategy key is a key date identifier.

15. The computer system of claim 13, wherein the selector strategy key is a business transaction identifier.

16. The computer system of claim 13, wherein the financial object represents a single position or subposition, the single position or subposition is involved within a hedging relationship.

17. The computer system of claim 13, wherein the financial instrument type is one selected from the group of stock, forward stock transaction, bond, over-the-counter (OTC) option, future and interest rate swap.

18. The computer system of claim 13, wherein the position values stored within the financial object include position or subposition information reflecting one or more transactions that have taken place during a trading period.

* * * * *